United States Patent
Chen et al.

(10) Patent No.: US 11,682,892 B2
(45) Date of Patent: Jun. 20, 2023

(54) COMPOSITE CIRCUIT PROTECTION DEVICE

(71) Applicant: FUZETEC TECHNOLOGY CO., LTD., New Taipei (TW)

(72) Inventors: Jack Jih-Sang Chen, New Taipei (TW); Chang Hung Jiang, New Taipei (TW)

(73) Assignee: FUZETEC TECHNOLOGY CO., LTD., New Taipei (TW)

( * ) Notice: Subject to any disclaimer, the term of this patent is extended or adjusted under 35 U.S.C. 154(b) by 28 days.

(21) Appl. No.: 17/396,518

(22) Filed: Aug. 6, 2021

(65) Prior Publication Data

US 2023/0059814 A1    Feb. 23, 2023

(51) Int. Cl.
*H02H 3/10* (2006.01)
*H01C 7/02* (2006.01)

(52) U.S. Cl.
CPC ............... *H02H 3/10* (2013.01); *H01C 7/02* (2013.01)

(58) Field of Classification Search
CPC .................................. H02H 3/10; H01C 7/02
USPC ........................................................ 361/93.1
See application file for complete search history.

(56) References Cited

U.S. PATENT DOCUMENTS 5,852,397 A * 12/1998 Chan ................ H01C 17/06586
                                                                338/312
8,508,328 B1 * 8/2013 Chen ........................ H01C 7/02
                                                                338/21
2007/0025044 A1 * 2/2007 Golubovic ............. H01C 7/102
                                                                361/124

FOREIGN PATENT DOCUMENTS

CN           105186477 A * 12/2015
EP             0974181 B1 * 10/2007
WO       WO-2020038120 A1 *  2/2020 ............. H02H 3/025

OTHER PUBLICATIONS

T. Fang and S. Morris, "Limit current surges with +TC resistors," in IEEE Circuits and Devices Magazine, vol. 9, No. 5, pp. 29-33, Sep. 1993, doi: 10.1109/101.232790 (Year: 1993).*
Littlefuse (Metal-Oxide Varistors (MOVs), Radial Lead Varistors > LA Varistor Series, Dec. 17, 2019) (Year: 2019).*
Metal-Oxide Varistors (MOVs), Radial Lead Varistors > LA Varistor Series, Dec. 17, 2019 (Year: 2019).*

* cited by examiner

*Primary Examiner* — Scott Bauer
*Assistant Examiner* — Sreeya Sreevatsa
(74) *Attorney, Agent, or Firm* — Hamre, Schumann, Mueller & Larson, P.C.

(57) ABSTRACT

A composite circuit protection device includes: a first positive temperature coefficient (PTC) component; a first voltage-dependent resistor (VDR); a second VDR; and a plurality of conductive leads that correspondingly connect to the first PTC component, the first VDR and the second VDR. The second VDR and the first PTC component are electrically connected in series, the first VDR is electrically connected to the series connection of the first PTC component and the second VDR in parallel, and the first VDR has a varistor voltage greater than that of the second VDR as determined at 1 mA.

18 Claims, 7 Drawing Sheets

COMPOSITE CIRCUIT PROTECTION DEVICE

FIELD

The disclosure relates to a circuit protection device, and more particularly to a composite circuit protection device.

BACKGROUND

U.S. Pat. No. 8,508,328 B1 discloses an insertable polymer positive temperature coefficient (PPTC) over-current protection device that includes: first and second electrodes; a solder material; conductive lead pins bonded to the first and second electrodes; and a PTC polymer matrix laminated between the first and second electrodes. The PTC polymer matrix is formed with at least one hole that has sufficient volume to accommodate thermal expansion of the PTC polymer matrix when the temperature of the PTC polymer matrix is increased.

Electrical properties (e.g., operating current and high-voltage surge endurability) of the PPTC over-current protection device are important for preventing power surge. When the operating current of the PPTC over-current protection device is increased by increasing the area of the PTC polymer matrix, it may become more vulnerable to power surge.

Although a voltage-dependent resistor could be combined with the PPTC component to impart over-current and over-voltage protection to the resultant composite circuit protection device, the voltage-dependent resistor might only withstand a power surge for a short time period (such as 0.001 seconds). That is, if the time period of the power surge exceeds a cut-off time period, the voltage-dependent resistor might burn out or be damaged due to over-current and over-voltage, causing permanent loss of function of the composite circuit protection device.

SUMMARY

Therefore, an object of the disclosure is to provide a composite circuit protection device that can alleviate at least one of the drawbacks of the prior art. According to the disclosure, the composite protection device includes: a first positive temperature coefficient (PTC) component; a first voltage-dependent resistor; a second voltage-dependent resistor; and a plurality of conductive leads that correspondingly connect to the first PTC component, the first voltage-dependent resistor, and the second voltage-dependent resistor. The second voltage dependent resistor and the first PTC component are electrically connected in series, the first voltage-dependent resistor and the second voltage-dependent resistor are electrically connected in parallel, the first PTC component and the first voltage-dependent resistor are electrically connected in parallel, and the first voltage-dependent resistor has a varistor voltage greater than that of the second voltage-dependent resistor as determined at 1 mA.

BRIEF DESCRIPTION OF THE DRAWINGS

Other features and advantages of the disclosure will become apparent in the following detailed description of the embodiments with reference to the accompanying drawings, of which.

DETAILED DESCRIPTION

Figure 1:
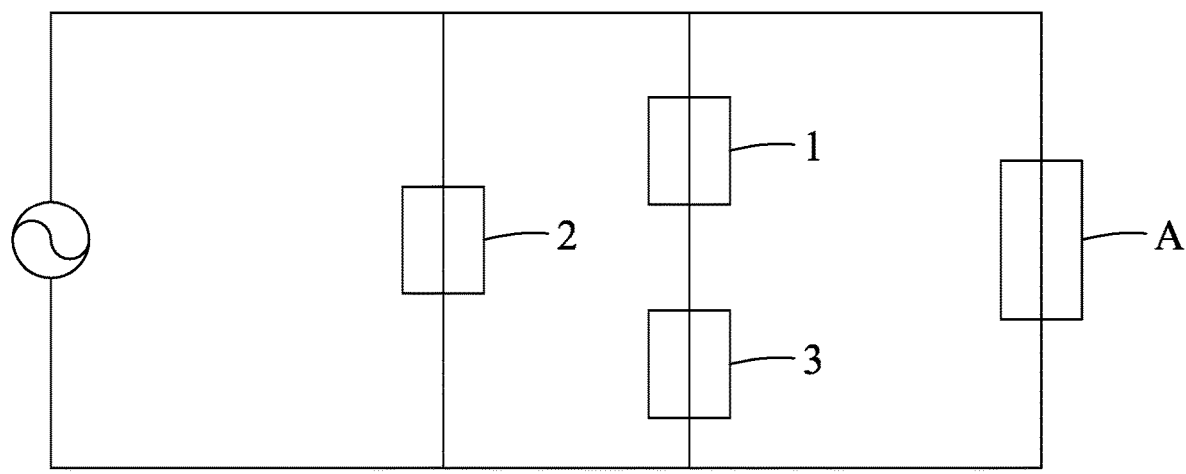
FIG. 1 is a schematic electrical diagram of a first embodiment of a composite circuit protection device according to the present disclosure.

Before the disclosure is described in greater detail, it should be noted that where considered appropriate, reference numerals or terminal portions of reference numerals have been repeated among the figures to indicate corresponding or analogous elements, which may optionally have similar characteristics.

Figure 2:
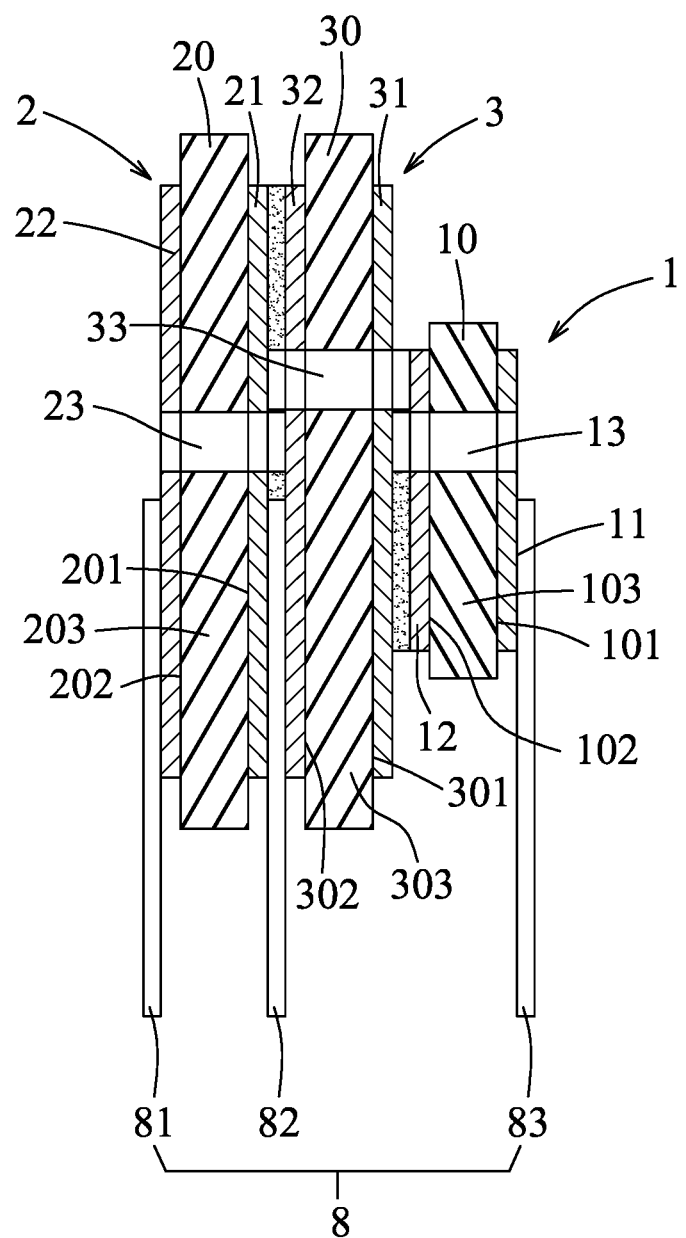
FIG. 2 is a schematic sectional view of the first embodiment of the composite circuit protection device.

Referring to FIGS. 1 and 2, a first embodiment of a composite circuit protection device for protecting a circuit device (A) according to the present disclosure includes a first positive temperature coefficient (PTC) component 1, a first voltage-dependent resistor 2, a second voltage-dependent resistor 3, and a plurality of conductive leads 8 that correspondingly connect to the first PTC component 1, the first voltage-dependent resistor 2, and the second voltage-dependent resistor 3. The second voltage-dependent resistor 3 and the first PTC component 1 are electrically connected in series, the first voltage-dependent resistor 2 and the second voltage-dependent resistor 3 are electrically connected in parallel, and the first PTC component 1 and the first voltage-dependent resistor 2 are electrically connected in parallel. The first voltage-dependent resistor 2 has a varistor voltage greater than that of the second voltage-dependent resistor 3 as determined at 1 mA.

In some embodiments, the first PTC component 1 includes a PTC layer 10 that has two opposite surfaces 101, 102, and first and second electrode layers 11, 12 that are respectively disposed on the two opposite surfaces 101, 102 of the PTC layer 10. In certain embodiments, the first and second electrode layers 11, 12 are respectively connected to the two opposite surfaces 101, 102 of the PTC layer 10 through a solder material. Each of the first and second electrode layers 11, 12 has a peripheral edge. The first voltage-dependent resistor 2 includes a first voltage-dependent resistor layer 20 that has two opposite surfaces 201, 202, and third and fourth electrode layers 21, 22 that are respectively disposed on the two opposite surfaces 201, 202 of the first voltage-dependent resistor layer 20. In certain embodiments, the third and fourth electrode layers 21, 22 are respectively connected to the two opposite surfaces 201, 202 of the first voltage-dependent resistor layer 20 through a solder material. Each of the third and fourth electrode layers 21, 22 has a peripheral edge. The second voltage-dependent resistor 3 includes a second voltage-dependent resistor layer 30 that has two opposite surfaces 301, 302, a fifth electrode layer 31 that is disposed on one of the two opposite surfaces 301, 302 of the second voltage-dependent resistor layer 30

(in FIG. 2, the fifth electrode layer 31 is disposed on the surface 301), and is adjacent to the second electrode layer 12 of the first PTC component 1, and a sixth electrode layer 32 that is disposed on the other one of the two opposite surfaces 301, 302 of the second voltage-dependent resistor layer 30 and is adjacent to the third electrode layer 21 of the first voltage-dependent resistor 2. In certain embodiments, the fifth and sixth electrode layers 31, 32 are respectively connected to the two opposite surfaces 301, 302 of the second voltage-dependent resistor layer 30 through a solder material. Each of the fifth and sixth electrode layers 31, 32 has a peripheral edge. The plurality of conductive leads 8 include a first conductive lead 81, a second conductive lead 82, and a third conductive lead 83. The first conductive lead 81 is connected to the fourth electrode layer 22 of the first voltage-dependent resistor 2 through a solder material, the second conductive lead 82 is connected to and is disposed between the third electrode layer 21 of the first voltage-dependent resistor 2 and the sixth electrode layer 32 of the second voltage-dependent resistor 3 through a solder material, and the third conductive lead 83 is connected to the first electrode layer 11 of the first PTC component 1 through a solder material. Each of the conductive leads 81, 82, 83 extends in a direction along a surface of a corresponding one of the electrode layers to which the each of the conductive leads 81, 82, 83 is connected.

In certain embodiments, each of the first and second electrode layers 11, 12 of the first PTC component 1 has a surface substantially parallel to a corresponding one of the two opposite surfaces 101, 102 on which the each of the first and second electrode layers 11, 12 is disposed. The surface of each of the first and second electrode layers 11, 12 has a surface area not greater than 90% of a surface area of the corresponding one of the two opposite surfaces 101, 102 on which the each of the first and second electrode layers 11, 12 is disposed.

In certain embodiments, each of the third and fourth electrode layers 21, 22 of the first voltage-dependent resistor 2 has a surface substantially parallel to a corresponding one of the two opposite surfaces 201, 202 on which the each of the third and fourth electrode layers 21, 22 is disposed. The surface of each of the third and fourth electrode layers 21, 22 has a surface area not greater than 90% of a surface area of the corresponding one of the two opposite surfaces 201, 202 on which the each of the third and fourth electrode layers 21, 22 is disposed.

In certain embodiments, each of the fifth and sixth electrode layers 31, 32 of the second voltage-dependent resistor 3 has a surface substantially parallel to a corresponding one of the two opposite surfaces 301, 302 on which the each of the fifth and sixth electrode layers 31, 32 is disposed. The surface of each of the fifth and sixth electrode layers 31, 32 has a surface area not greater than 90% of a surface area of the corresponding one of the two opposite surfaces 301, 302 on which the each of the fifth and sixth electrode layers 31, 32 is disposed.

In some embodiments, the varistor voltage of the first voltage-dependent resistor 2 may be greater than 110% of the varistor voltage of the second voltage-dependent resistor 3 as determined at 1 mA. In some embodiments, the varistor voltage of the first voltage-dependent resistor may be greater than 120% of the varistor voltage of the second voltage-dependent resistor as determined at 1 mA.

In some embodiments, the first PTC component 1 may be a first polymer PTC (PPTC) component 1. In this embodiment, the first PPTC component 1 trips before one of the first and second voltage-dependent resistors 2, 3 burns out in the presence of an over-current or an over-voltage. In certain embodiments, the first PPTC component 1 trips from 0.00001 seconds to within 10 seconds in the presence of an over-current or an over-voltage. In certain embodiments, the first PPTC component 1 trips from 0.001 seconds to within 10 seconds in the presence of an over-current that is greater than 0.5 A or an over-voltage that is greater than a varistor voltage of each of the first and second voltage-dependent resistors 2, 3. In certain embodiments, the first PPTC component 1 trips from 0.001 seconds to within 1 second in the presence of an over-current that is greater than 10 A or an over-voltage that is greater than a varistor voltage of each of the first and second voltage-dependent resistors 2, 3.

In certain embodiments, the first PTC component 1 is formed with at least one hole 13 (see FIG. 2). The hole 13 is formed in the PTC layer 10. The PTC layer 10 of the first PTC component 1 has a peripheral edge 103 that defines a boundary of the PTC layer 10 and interconnects the two opposite surfaces 101, 102 of the PTC layer 10. The hole 13 is spaced apart from the peripheral edge 103, and has a sufficient volume to accommodate thermal expansion of the PTC layer 10 when the temperature of the PTC layer 10 is increased, so as to avoid undesired structural deformation of the PTC layer 10, which may be disadvantageous for electrical properties (e.g., operating current and high-voltage surge endurability) of the PTC layer 10. In certain embodiments, the hole 13 extends through at least one of the two opposite surfaces 101, 102 of the PTC layer 10. In certain embodiments, the hole 13 further extends through at least one of the first and second electrode layers 11, 12. In this embodiment, the hole 13 extends through the two opposite surfaces 101, 102 of the PTC layer 10 and the first and second electrode layers 11, 12, so as to form a through hole. In some embodiments, the hole 13 extends along a line passing through a geometric center of the first PTC component 1 and transverse to the opposite surfaces 101, 102 of the PTC layer 10. The hole 13 is defined by a hole-defining wall which has a cross section that is parallel to the two opposite surfaces 101, 102 of the PTC layer 10. The cross section of the hole-defining wall is in the shape of a circle, square, oval, triangle, crisscross, or etc.

In certain embodiments, the first voltage-dependent resistor 2 is formed with at least one hole 23 (see FIG. 2). The hole 23 is formed in the first voltage-dependent resistor layer 20. The first voltage-dependent resistor layer 20 of the first voltage-dependent resistor 2 has a peripheral edge 203 that defines a boundary of the first voltage-dependent resistor layer 20 and interconnects the two opposite surfaces 201, 202 of the first voltage-dependent resistor layer 20. The hole 23 is spaced apart from the peripheral edge 203, and has sufficient volume to accommodate thermal expansion of the first voltage-dependent resistor layer 20 when the temperature of the first voltage-dependent resistor layer 20 is increased, so as to avoid undesired structural deformation of the first voltage-dependent resistor layer 20, which may be disadvantageous for the electrical properties of the first voltage-dependent resistor layer 20. In certain embodiments, the hole 23 extends through at least one of the two opposite surfaces 201, 202 of the first voltage-dependent resistor layer 20. In certain embodiments, the hole 23 further extends through at least one of the third and fourth electrode layers 21, 22. In this embodiment, the hole 23 extends through the two opposite surfaces 201, 202 of the first voltage-dependent resistor layer 20 and the third and fourth electrode layers 21, 22, so as to form a through hole. In some embodiments, the hole 23 extends along a line passing through a geometric center of the first voltage-dependent resistor 2 and transverse to the opposite surfaces 201, 202 of the first voltage-dependent resistor layer 2. The hole 23 is defined by a hole-defining wall which has a cross section parallel to the two opposite surfaces 201, 202 of the first voltage-dependent resistor layer 20. The cross section of the hole-defining wall is in the shape of a circle, square, oval, triangle, crisscross, or etc.

In certain embodiments, the second voltage-dependent resistor 3 is formed with at least one hole 33 (see FIG. 2). The hole 33 is formed in the second voltage-dependent resistor layer 30. The second voltage-dependent resistor layer 30 of the second voltage-dependent resistor 3 has a peripheral edge 303 that defines a boundary of the second voltage-dependent resistor layer 30 and interconnects the two opposite surfaces 301, 302 of the second voltage-dependent resistor layer 30. The hole 33 is spaced apart from the peripheral edge 303, and has sufficient volume to accommodate thermal expansion of the second voltage-dependent resistor layer 30 when the temperature of the second voltage-dependent resistor layer 30 is increased, so as to avoid undesired structural deformation of the second voltage-dependent resistor layer 30, which may be disadvantageous for the electrical properties of the second voltage-dependent resistor layer 30. In certain embodiments, the hole 33 extends through at least one of the two opposite surfaces 301, 302 of the second voltage-dependent resistor layer 30. In certain embodiments, the hole 33 further extends through at least one of the fifth and sixth electrode layers 31, 32. In this embodiment, the hole 33 extends through the two opposite surfaces 301, 302 of the second voltage-dependent resistor 3 and the fifth and sixth electrode layers 31, 32, so as to form a through hole. In some embodiments, the hole 33 extends along a line passing through a geometric center of the second voltage-dependent resistor 3 and transverse to the opposite surfaces 301, 302 of the second voltage-dependent resistor layer 30. The hole 33 is defined by a hole-defining wall which has a cross section parallel to the two opposite surfaces 301, 302 of the second voltage-dependent resistor layer 30. The cross section of the hole-defining wall is in the shape of a circle, square, oval, triangle, crisscross, or etc.

According to the present disclosure, the PTC layer 10 of the first PTC component 1 includes a PTC matrix and a conductive filler dispersed in the PTC matrix. The PTC matrix may be made from a polymer composition that contains a non-grafted olefin-based polymer. In certain embodiments, the non-grafted olefin-based polymer may be, but not limited to, high density polyethylene (HDPE). In certain embodiments, the polymer composition of the PTC matrix may further include a grafted olefin-based polymer. In certain embodiments, the grafted olefin-based polymer may be, but not limited to, unsaturated carboxylic acid anhydride-grafted olefin-based polymer, e.g., a maleic anhydride-grafted olefin-based polymer. Examples of the conductive filler suitable for use in this disclosure include, but are not limited to, carbon black, metal powders, conductive ceramic powders, and combinations thereof.

In certain embodiments, the first voltage-dependent resistor 2 includes a metal-oxide material. In certain embodiments, the second voltage-dependent resistor 3 includes a metal-oxide material. In some embodiments, the first voltage-dependent resistor 2 and the second voltage-dependent resistor 3 may be metal-oxide varistors (i.e., a type of voltage-dependent resistor).

Figure 3:
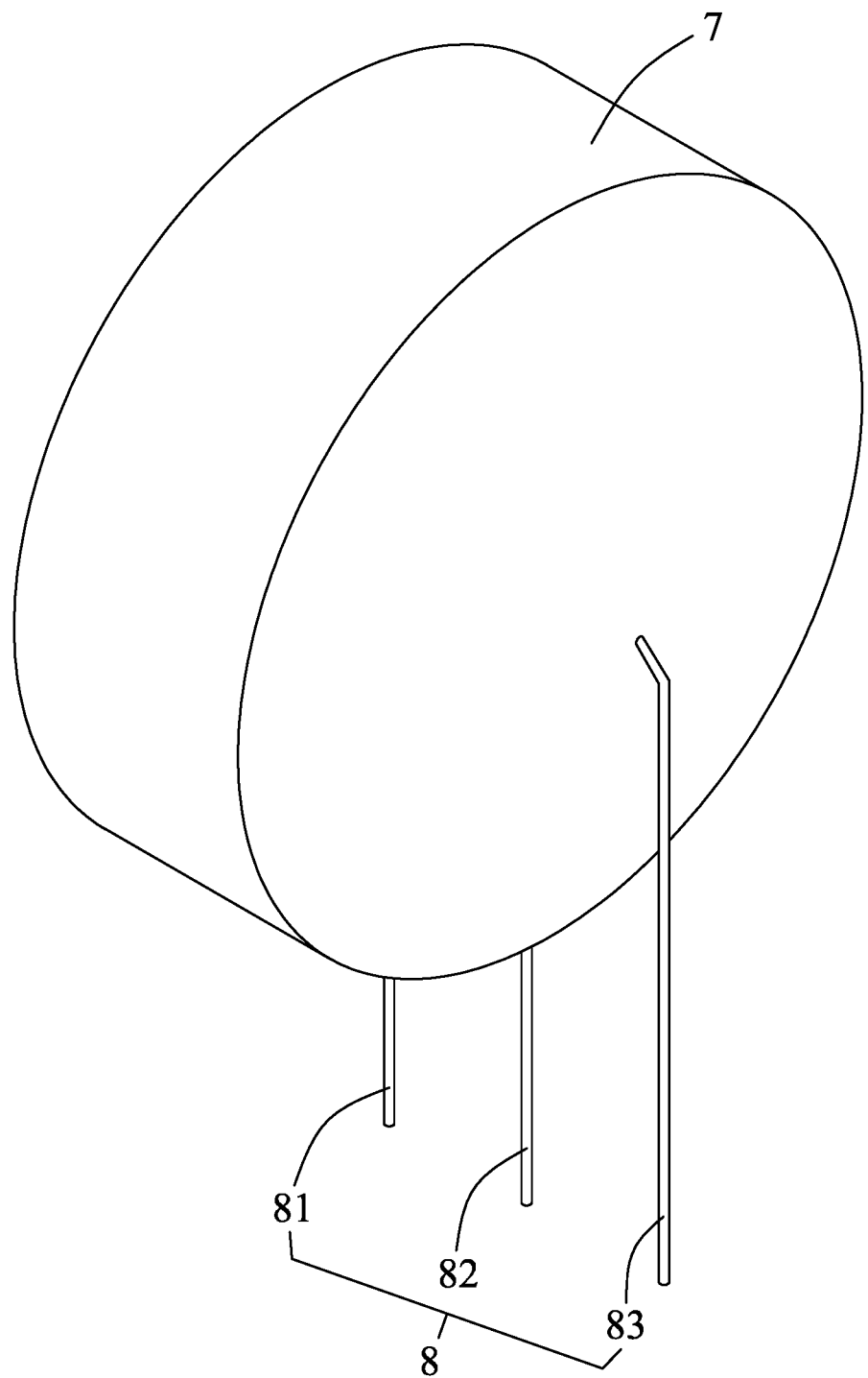
FIG. 3 is a perspective view of a second embodiment of the composite circuit protection device according to the present disclosure.

FIG. 3 illustrates a second embodiment of the composite circuit protection device according to the present disclosure. Referring to FIG. 3, the second embodiment of the composite circuit protection device according to the present disclosure has a structure similar to that of the first embodiment, except that the second embodiment further includes an encapsulant 7 that encloses the first PTC component 1, the first voltage-dependent resistor 2, the second voltage-dependent resistor 3, a portion of the first conductive lead 81, a portion of the second conductive lead 82, and a portion of the third conductive lead 83. In certain embodiments, the encapsulant 7 is made from epoxy resin.

Figure 4:
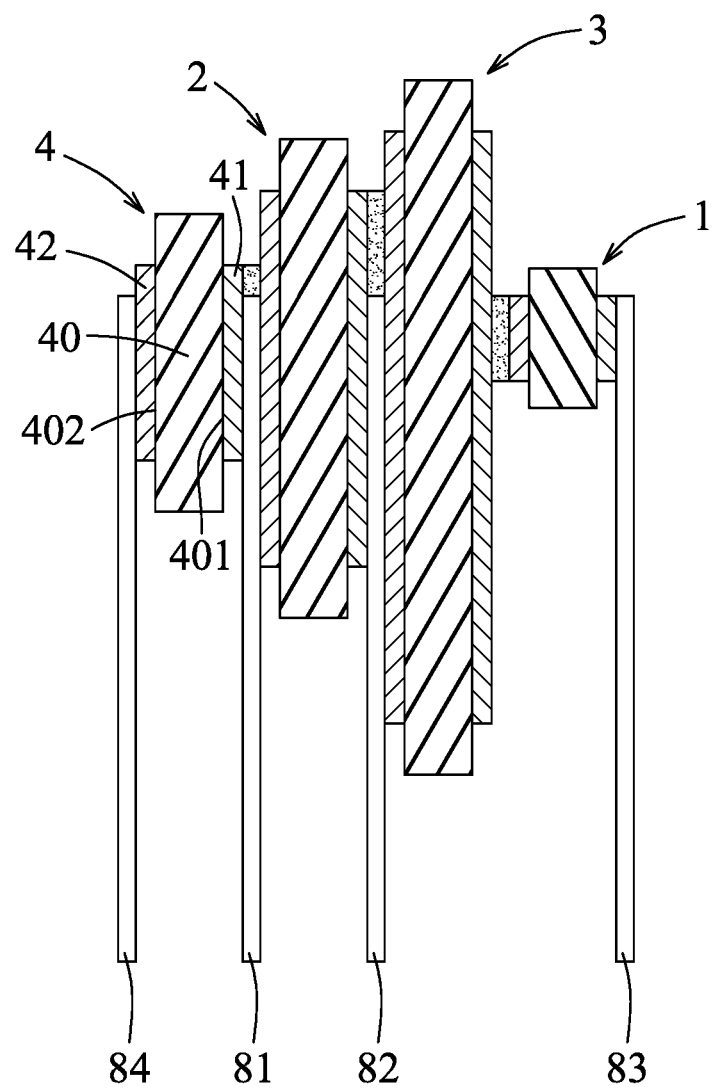
FIG. 4 is a schematic sectional view of a third embodiment of the composite circuit protection device according to the present disclosure.
Figure 5:
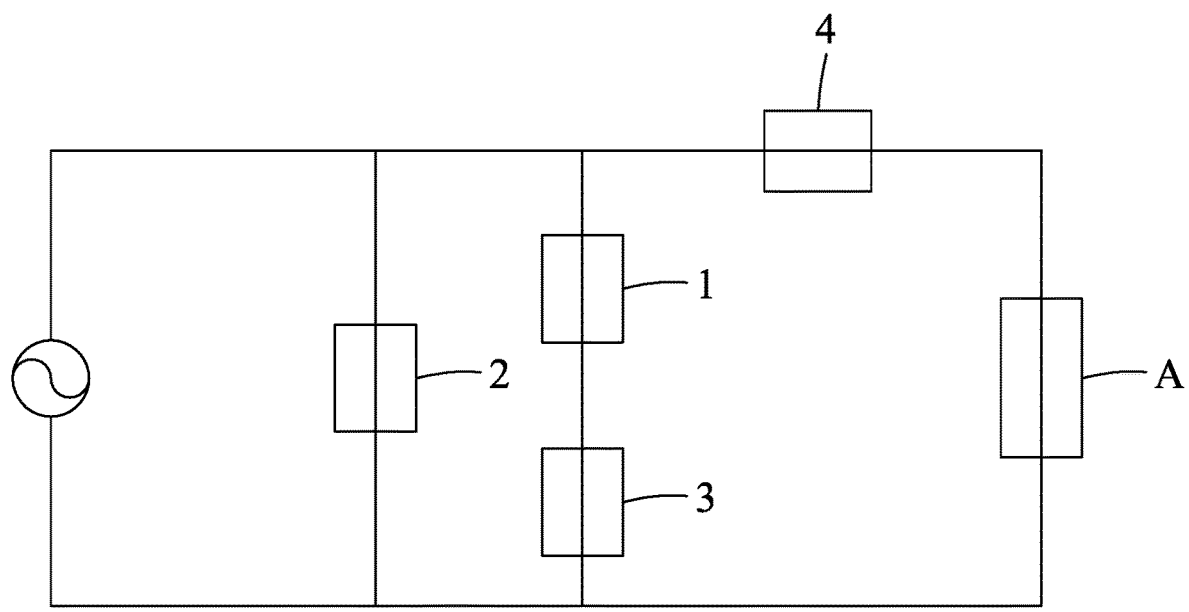
FIG. 5 is a schematic electrical diagram of the third embodiment of the composite circuit protection device.

FIGS. 4 and 5 illustrate a third embodiment of the composite circuit protection device according to the present disclosure.

Referring to FIGS. 4 and 5, the third embodiment of the composite circuit protection device according to the present disclosure has a structure similar to that of the first embodiment, except that the third embodiment further includes a second PTC component 4 that is electrically connected to the first PTC component 1 in parallel, that is electrically connected to the first voltage-dependent resistor 2 in parallel, and that is electrically connected to the second voltage-dependent resistor 3 in parallel. In this embodiment, the second PTC component 4 is electrically connected to the circuit device (A) in series. The second PTC component 4 includes a second PTC component layer 40 that has two opposite surfaces 401, 402, and seventh and eighth electrode layers 41, 42 that are respectively disposed on the two opposite surfaces 401, 402 of the second PTC component 4. In certain embodiments, the seventh and eighth electrode layers 41, 42 are respectively connected to the two opposite surfaces 401, 402 of the second PTC component layer 40 through a solder material. The plurality of conductive leads 8 further includes a fourth conductive lead 84. The fourth conductive lead 84 is connected to the eighth electrode layer 42 of the second PTC component 4 through a solder material. The first conductive lead 81 is connected to and is disposed between the fourth electrode layer 22 of the first voltage-dependent resistor 2 and the seventh electrode layer 41 of the second PTC component 4 through a solder material. The fourth conductive lead 84 extends in a direction along a surface of the eighth electrode layer 42. In certain embodiments, the second PTC component is formed with at least one hole (not shown). In certain embodiments, each of the seventh and eighth electrode layers 41, 42 of the second PTC component 4 has a surface substantially parallel to a corresponding one of the two opposite surfaces 401, 402 on which the each of the seventh and eighth electrode layers 41, 42 is disposed. The surface of each of the seventh and eighth electrode layers 41, 42 has a surface area not greater than 90% of a surface area of the corresponding one of the two opposite surfaces 401, 402 on which the each of the seventh and eighth electrode layers 41, 42 is disposed.

Figure 6:
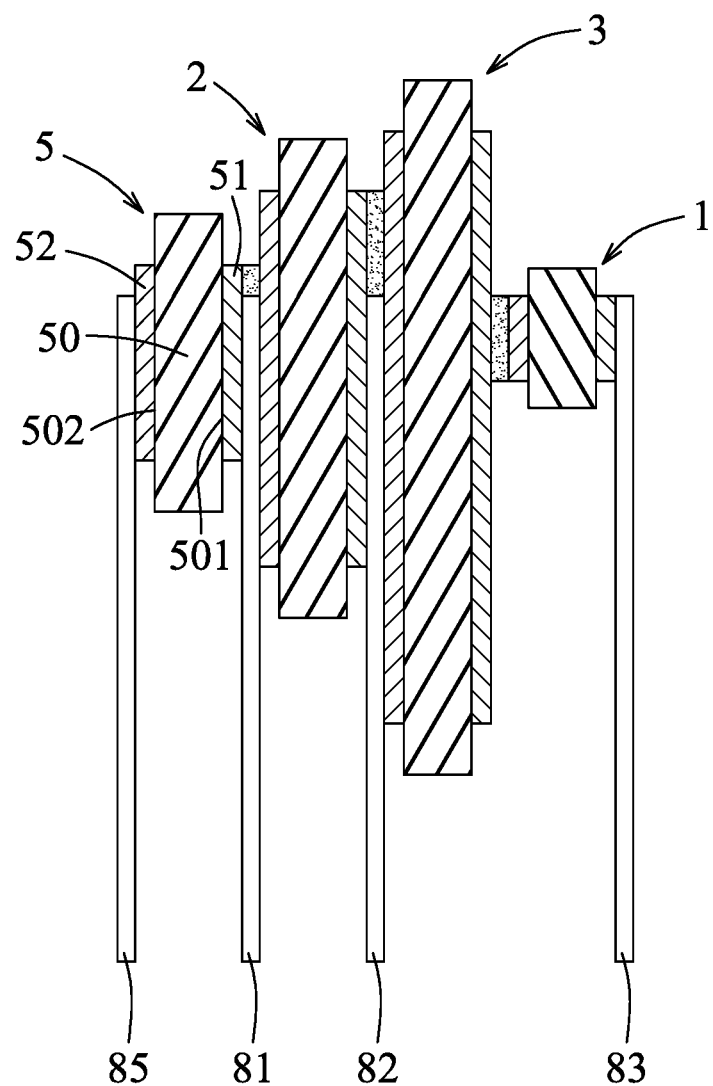
FIG. 6 is a schematic sectional view of a fourth embodiment of the composite circuit protection device according to the present disclosure.
Figure 7:
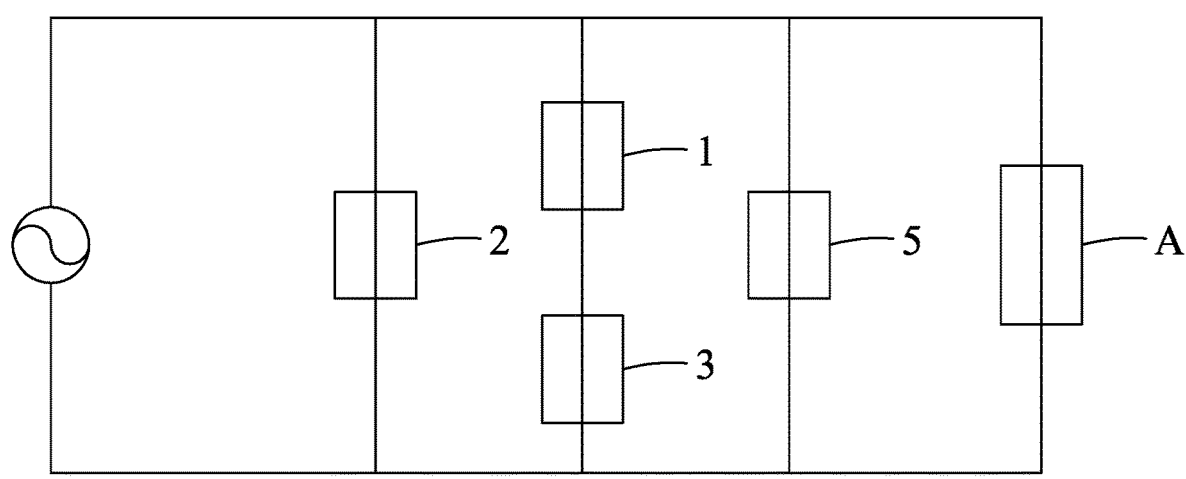
FIG. 7 is a schematic electrical diagram of the fourth embodiment of the composite circuit protection device.

FIGS. 6 and 7 illustrate a fourth embodiment of the composite circuit protection device according to the present disclosure. Referring to FIGS. 6 and 7, the fourth embodiment of the composite circuit protection device according to the present disclosure has a structure similar to that of the first embodiment, except that the fourth embodiment further includes a third voltage-dependent resistor 5 that is electrically connected to the first PTC component 1 in parallel, that is electrically connected to the first voltage-dependent resistor 2 in parallel, and that is electrically connected to the second voltage-dependent resistor 3 in parallel. In this embodiment, the third voltage-dependent resistor 5 is electrically connected to the circuit device (A) in parallel. The third voltage-dependent resistor 5 includes a third voltage-dependent resistor layer 50 that has two opposite surfaces 501, 502, and ninth and tenth electrode layers 51, 52 that are respectively disposed on the two opposite surfaces 501, 502 of the third voltage-dependent resistor 5. In certain embodiments, the ninth and tenth electrode layers 51, 52 are respectively connected to the two opposite surfaces 501, 502 of the third voltage-dependent resistor layer 50 through a solder material. The plurality of conductive leads 8 further includes a fifth conductive lead 85. The fifth conductive lead 85 is connected to the tenth electrode layer 52 of the third voltage-dependent resistor 5 through a solder material. The first conductive lead 81 is connected to and is disposed between the fourth electrode layer 22 of the first voltage-dependent resistor 2 and the ninth electrode layer 51 of the third voltage-dependent resistor 5 through a solder material. The fifth conductive lead 85 extends in a direction along a surface of the tenth electrode layer 52. In certain embodiments, the third voltage-dependent resistor 5 is formed with at least one hole (not shown). In certain embodiments, each of the ninth and tenth electrode layers 51, 52 of the third voltage-dependent resistor 5 has a surface substantially parallel to a corresponding one of the two opposite surfaces 501, 502 on which the each of the ninth and tenth electrode layers 51, 52 is disposed. The surface of each of the ninth and tenth electrode layers 51, 52 has a surface area not greater than 90% of a surface area of the corresponding one of the two opposite surfaces 501, 502 on which the each of the ninth and tenth electrode layers 51, 52 is disposed.

The disclosure will be further described by way of the following examples and comparative examples. However, it should be understood that the following examples are solely intended for the purpose of illustration and should not be construed as limiting the disclosure in practice.

EXAMPLES

Example 1 (E1)

10 grams of HDPE (polymer 1, purchased from Formosa Plastics Corp., catalog no.: HDPE9002) serving as the non-grafted olefin-based polymer, 10 grams of maleic anhydride-grafted HDPE (purchased from Dupont, catalog no.: MB100D) serving as the carboxylic acid anhydride-grafted olefin-based polymer, 15 grams of carbon black powder (purchased from Columbian Chemicals Co., catalog no.: Raven 430UB, serving as the conductive filler), and 15 grams of magnesium hydroxide (purchased from Martin Marietta Magnesia Specialties, LLC, MagChem® MH 10) were compounded in a Brabender mixer. The compounding temperature was 200° C., the stirring rate was 30 rpm, and the compounding time was 10 minutes.

The compounded mixture was hot pressed in a mold so as to form a thin PTC polymeric (PPTC) layer having a thickness of 1.5 mm. The hot pressing temperature was 200° C., the hot pressing time was 4 minutes, and the hot pressing pressure was 80 kg/cm².

Two copper foil sheets (serving as the first electrode layer 11 and the second electrode layer 12, respectively) were respectively attached to two opposite surfaces of the PPTC layer and were hot pressed under 200° C. and 80 kg/cm² for 4 minutes to form a sandwiched structure of a PPTC laminate having a thickness of 2.2 mm. The PPTC laminate was then cut into a plurality of PPTC chips having a circular shape (diameter: 14.5 mm, area: 165.0 mm²; each electrode layer diameter: 13.7 mm, each electrode layer area: 147.3 mm²). Thereafter, each PPTC chip (serving as the first PTC component 1) was irradiated with a Cobalt-60 gamma ray for a total irradiation dose of 150 kGy.

A second metal-oxide varistor (MOV-2, serving as the second voltage-dependent resistor 3, purchased from Ceramate Technical Corp., Model No: 20D361K, diameter: 20.0 mm, area: 314.0 mm², including two electrodes (i.e., the aforesaid fifth and sixth electrode layers 31, 32, each with an electrode layer diameter of 18.9 mm and an electrode layer area of 280.4 mm²) was connected to the PPTC chip with the fifth electrode layer 31 being welded to one of the copper foil sheets of the PPTC chip, followed by welding a conductive lead (serving as the third conductive lead 83) to another one of the copper foil sheets of the PPTC chip. A second conductive lead 82 was welded to the sixth electrode layer 32 of the second metal-oxide varistor. A first metal-oxide varistor (MOV-1, serving as the first voltage-dependent resistor 2, purchased from Ceramate Technical Corp., Model No: 20D431K, diameter: 20.0 mm, area: 314.0 mm², including two electrodes (i.e., the aforesaid third and fourth electrode layer 21, 22, each with an electrode layer diameter of 18.9 mm, and an electrode layer area of 280.4 mm²) was provided, and the third electrode layer 21 of the first metal-oxide varistor was welded to the second conductive lead 82. A conductive lead (serving as the first conductive lead 81) was welded to the fourth electrode layer 22 of the first metal-oxide varistor so as to form a composite circuit protection device as shown in FIGS. 1 and 2. In E1, the MOV-1 was electrically connected to the PPTC chip in parallel, and the MOV-2 was electrically connected to the PPTC chip in series.

The PPTC chip was subjected to determination of a hold current (i.e., a maximum current value which can be applied in normal operation), a trip current (i.e., a minimum current value which is necessary for a PPTC component to achieve a high-resistance state), a rated voltage (i.e., a voltage at which the PPTC component is designed to work with) and a withstand voltage (i.e., a maximum voltage limit where the PPTC component will not malfunction or be damaged) according to the Underwriter Laboratories UL 1434 Standard for Safety for Thermistor-Type Devices. In addition, the MOV-1 and MOV-2 were subjected to determination of a varistor voltage (i.e., a voltage at which an MOV component is designed to work with) and a clamping voltage (i.e., a maximum voltage that an MOV component can endure) according to the Underwriter Laboratories UL 1449 Standard for Safety for Transient Voltage Surge Suppressors. The characteristic results are shown in Tables 1 and 2.

TABLE 1

|  | Hold Current (A) | Trip Current (A) | Rated Voltage (V) | Withstand Voltage (V) |
| --- | --- | --- | --- | --- |
| PPTC chip | 0.08 | 0.16 | 250 | 250 |

TABLE 2

|  | Varistor voltage[a] | Clamping Voltage[b] | Maximum Peak Current[c] |
| --- | --- | --- | --- |
| MOV-1 | 431 V | 710 V | 6500 A |
| MOV-2 | 360 V | 595 V | 6500 A |

[a]determined at 1 mA
[b]determined at a test pulse time ($t_p$) = 8/20 μs and a test pulse current ($I_P$) = 50 A
[c]determined at a test pulse time ($t_p$) = 8/20 μs Example 2 (E2)

The structure of the composite circuit protection device of E2 is similar to that of E1, except that a circular through hole is formed in the first voltage-dependent resistor (having a diameter (d) of 1.5 mm and a hole area ($\Pi d^2/4$) of 1.77 mm$^2$) (see Table 3).

Example 3 (E3)

The structure of the composite circuit protection device of E3 is similar to that of E1, except that a circular through hole is formed in the second voltage-dependent resistor (having a diameter (d) of 1.5 mm and a hole area ($\Pi d^2/4$) of 1.77 mm$^2$) (see Table 3).

Example 4 (E4)

The structure of the composite circuit protection device of E4 is similar to that of E2, except that a circular through hole is also formed in the second voltage-dependent resistor (having a diameter (d) of 1.5 mm and a hole area ($\Pi d^2/4$) of 1.77 mm$^2$) (see Table 3).

Example 5 (E5)

The structure of the composite circuit protection device of E5 is similar to that of E1, except that a circular through hole is formed in the PPTC chip (having a diameter (d) of 1.5 mm and a hole area ($\Pi d^2/4$) of 1.77 mm$^2$) (see Table 3).

Example 6 (E6)

The structure of the composite circuit protection device of E6 is similar to that of E2, except that a circular through hole is formed in the PPTC chip (having a diameter (d) of 1.5 mm and a hole area ($\Pi d^2/4$) of 1.77 mm$^2$) (see Table 3).

Example 7 (E7)

The structure of the composite circuit protection device of E7 is similar to that of E3, except that a circular through hole is formed in the PPTC chip (having a diameter (d) of 1.5 mm and a hole area ($\Pi d^2/4$) of 1.77 mm$^2$) (see Table 3).

Example 8 (E8)

The structure of the composite circuit protection device of E8 is similar to that of E4, except that a circular through hole is formed in the PPTC chip (having a diameter (d) of 1.5 mm and a hole area ($\Pi d^2/4$) of 1.77 mm$^2$) (see Table 3).

Comparative Examples 1 to 2 (CE1 to CE2)

A testing device of CE1 included only the first voltage-dependent resistor 2 (MOV-1) used in E1. A testing device of CE2 included only the MOV-1 used in E1, and the MOV-1 was formed with a circular through hole (with a diameter of 1.5 mm and having a position the same as that in E2) (see Table 3).

Comparative Examples 3 to 4 (CE3 to CE4)

A testing device of CE3 included only the second voltage-dependent resistor 3 (MOV-2) used in E1. A testing device of CE4 included only the MOV-2 used in E1, and the MOV-2 was formed with a circular through hole (with a diameter of 1.5 mm and having a position the same as that in E3) (see Table 3).

Comparative Examples 5 to 8 (CE5 to CE8)

The procedures and conditions in preparing the composite circuit protection devices of CE5 to CE8 were similar to those of E1 except that, the MOV-2 was not included in CE5 to CE8, and the MOV-1 was disposed in the position where the MOV-2 is located in E1 (i.e., in CE5 to CE8, the MOV-1 was electrically connected to the PPTC chip in series). In addition, the PPTC chip of the composite circuit protection device of CE6 was formed with a circular through hole, the MOV-1 of the composite circuit protection device of CE7 was formed with a circular through hole, and each of the MOV-1 and the PPTC chip of the composite circuit protection device of CE8 was formed with a circular through hole. Each circular through hole has a diameter of 1.5 mm and the position thereof was the same as that in E6) (see Table 3).

Comparative Examples 9 to 12 (CE9 to CE12)

The procedures and conditions in preparing the composite circuit protection devices of CE9 to CE12 were similar to those of E1 except that, the first voltage-dependent resistor (MOV-1) was not included in CE9 to CE12. In CE9 to CE12, the MOV-2 was electrically connected to the PPTC chip in series. In addition, the PPTC chip of the composite circuit protection device of CE10 was formed with a circular through hole, the MOV-2 of the composite circuit protection device of CE11 was formed with a circular through hole, and the MOV-2 and the PPTC chip of the composite circuit protection device of CE12 were both formed with a circular through hole (the circular through hole having a diameter of 1.5 mm and being disposed at a position the same as that in E7) (see Table 3).

Comparative Examples 13 to 20 (CE13 to CE20)

The procedures and conditions in preparing the composite circuit protection devices of CE13 to CE20 were similar to those of E1 except that, in each of CE13 and CE20, the positions of the first voltage-dependent resistor (MOV-1) and the second voltage-dependent resistor (MOV-2) were interchanged. That is, in each of CE13 and CE20, the MOV-1 and the PPTC chip were electrically connected in series, and the MOV-2 and the PPTC chip were electrically connected in parallel. In addition, the MOV-2 of the composite circuit protection device of CE14 was formed with a circular through hole, the MOV-1 of the composite circuit protection device of CE15 was formed with a circular through hole, the MOV-1 and the MOV-2 of the composite circuit protection device of CE16 were both formed with a circular through hole, the PPTC chip of the composite circuit protection device of CE17 was formed with a circular through hole, the MOV-2 and the PPTC chip of the composite circuit protection device of CE18 were both formed with a circular through hole, the MOV-1 and the PPTC chip of the composite circuit protection device of CE19 were both formed with a circular through hole, and the MOV-2, the MOV-1, and the PPTC chip of the composite circuit protection device of CE20 were formed with a circular through hole (the circular through hole having a diameter of 1.5 mm and being disposed at a position the same as that in E8) (see Table 3).

The structure of the devices of E1 to E8 and CE1 to CE20 are summarized in Table 3, where V is an indicator for existence, position 1 stands for the position of the MOV at which the MOV is electrically connected to the PPTC chip in parallel, and position 2 stands for the position of MOV at which the MOV is electrically connected to the PPTC chip in series.

TABLE 3

Composite circuit protection device

| | Position 1 voltage-dependent resistor | | Position 2 voltage-dependent resistor | | PTC component | |
|---|---|---|---|---|---|---|
| | Type | Hole | Type | Hole | PPTC chip | Hole |
| E1 | MOV-1 | | MOV-2 | | V | |
| E2 | MOV-1 | V | MOV-2 | | V | |
| E3 | MOV-1 | | MOV-2 | V | V | |
| E4 | MOV-1 | V | MOV-2 | V | V | |
| E5 | MOV-1 | | MOV-2 | | V | V |
| E6 | MOV-1 | V | MOV-2 | | V | V |
| E7 | MOV-1 | | MOV-2 | V | V | V |
| E8 | MOV-1 | V | MOV-2 | V | V | V |
| C1 | MOV-1 | | | | | |
| C2 | MOV-1 | V | | | | |
| C3 | MOV-2 | | | | | |
| C4 | MOV-2 | V | | | | |
| C5 | | | MOV-1 | | V | |
| C6 | | | MOV-1 | | V | V |
| C7 | | | MOV-1 | V | V | |
| C8 | | | MOV-1 | V | V | V |
| C9 | | | MOV-2 | | V | |
| C10 | | | MOV-2 | | V | V |
| C11 | | | MOV-2 | V | V | |
| C12 | | | MOV-2 | V | V | V |
| C13 | MOV-2 | | MOV-1 | | V | |
| C14 | MOV-2 | V | MOV-1 | | V | |
| C15 | MOV-2 | | MOV-1 | V | V | |
| C16 | MOV-2 | V | MOV-1 | V | V | |
| C17 | MOV-2 | | MOV-1 | | V | V |
| C18 | MOV-2 | V | MOV-1 | | V | V |
| C19 | MOV-2 | | MOV-1 | V | V | V |
| C20 | MOV-2 | V | MOV-1 | V | V | V |

Performance Test

High Current Impulse Test

Ten composite circuit protection devices of each of E1 to E8 and CE1 to CE20, serving as test devices, were subjected to a high current impulse test.

The high current impulse test was performed using a multiple impulse generator (MIG0624LP1, EMC Partner). Specifically, the high current impulse test for each test device was conducted under 25° C. in the presence of a voltage that is greater than the varistor voltage of the MOV-1 and/or the MOV-2 (i.e., 600 Vdc, 650 Vdc, 700 Vdc, and 750 Vdc) and an over-current for the PPTC chip (i.e., 6500 A) (current waveform: 8/20 μs). The results are shown in Table 4. It should be noted that the MOV-1 has a varistor voltage greater than that of the MOV-2 as determined at 1 mA.

TABLE 4

High Current Impulse Test Results (8/20 μs)

| | 600 V at 6500 A | 650 V at 6500 A | 700 V at 6500 A | 750 V at 6500 A |
|---|---|---|---|---|
| E1 | Pass | Pass | Pass | Pass |
| E2 | Pass | Pass | Pass | Pass |
| E3 | Pass | Pass | Pass | Pass |
| E4 | Pass | Pass | Pass | Pass |
| E5 | Pass | Pass | Pass | Pass |
| E6 | Pass | Pass | Pass | Pass |
| E7 | Pass | Pass | Pass | Pass |
| E8 | Pass | Pass | Pass | Pass |
| C1 | Pass | Pass | Pass | MOV-1 Burned |
| C2 | Pass | Pass | Pass | MOV-1 Burned |
| C3 | MOV-2 Burned | MOV-2 Burned | MOV-2 Burned | MOV-2 Burned |
| C4 | MOV-2 Burned | MOV-2 Burned | MOV-2 Burned | MOV-2 Burned |
| C5 | Pass | Pass | Pass | MOV-1 Burned |
| C6 | Pass | Pass | Pass | MOV-1 Burned |
| C7 | Pass | Pass | Pass | MOV-1 Burned |
| C8 | Pass | Pass | Pass | MOV-1 Burned |
| C9 | MOV-2 Burned | MOV-2 Burned | MOV-2 Burned | MOV-2 Burned |
| C10 | MOV-2 Burned | MOV-2 Burned | MOV-2 Burned | MOV-2 Burned |
| C11 | MOV-2 Burned | MOV-2 Burned | MOV-2 Burned | MOV-2 Burned |
| C12 | MOV-2 Burned | MOV-2 Burned | MOV-2 Burned | MOV-2 Burned |
| C13 | MOV-2 Burned | MOV-2 Burned | MOV-2 Burned | MOV-1 Burned |
| C14 | MOV-2 Burned | MOV-2 Burned | MOV-2 Burned | MOV-1 Burned |
| C15 | MOV-2 Burned | MOV-2 Burned | MOV-2 Burned | MOV-1 Burned |
| C16 | MOV-2 Burned | MOV-2 Burned | MOV-2 Burned | MOV-1 Burned |
| C17 | MOV-2 Burned | MOV-2 Burned | MOV-2 Burned | MOV-1 Burned |
| C18 | MOV-2 Burned | MOV-2 Burned | MOV-2 Burned | MOV-1 Burned |
| C19 | MOV-2 Burned | MOV-2 Burned | MOV-2 Burned | MOV-1 Burned |
| C20 | MOV-2 Burned | MOV-2 Burned | MOV-2 Burned | MOV-1 Burned |

As shown in Table 4, the test devices of CE1 and CE2 containing only the MOV-1 were burned out under the over-current of 6500 A and the over-voltage of 750 V that is greater than the clamping voltage of the MOV-1 (710 V), and such damage from the burn-out cannot be repaired. In addition, the test devices of CE3 and CE4 containing only the MOV-2 were burned out under the over-current of 6500 A and the over-voltage that is greater than the clamping voltage of the MOV-2 (595 V). Moreover, the test devices of CE5 to CE12 containing only the PPTC chip and one of the MOV-1 and the MOV-2 were burned out under the over-current of 6500 A and the over-voltage that is greater than the clamping voltage of the MOV-1 or MOV-2. Additionally, the test devices of CE13 to CE20 containing the PPTC chip, the MOV-1 and the MOV-2, with the arrangement of PPTC chip, the MOV-1 and the MOV-2 being different from that of E1 to E8 (i.e., placing the MOV-1 in position 2 and not position 1 and placing the MOV-2 in position 1 and not position 2), were burned out under the over-current of 6500 A and the over-voltage. Specifically, when the applied voltage ranged between 600 V and 700 V, the MOV-2 burned out due to the applied voltage being larger than the clamping voltage of MOV-2. Moreover, when the applied voltage was greater than the clamping voltage of the MOV-1 (i.e., 710 V), the MOV-1 burned out due to the over-current and the over-voltage. In contrast, all of the test devices of E1 to E8 containing the combination of the PPTC chip, the MOV-1 and the MOV-2 passed the high current impulse test without being burned out. This may be due to the fact that the MOV-1 is electrically connected to the PPTC chip in parallel and the MOV-2 is electrically connected to the PPTC chip in series (i.e., the MOV-1 being in position 1 and the MOV-2 being in position 2).

Surge Immunity Test

Ten composite circuit protection devices of each of E1 to E8 and CE1 to CE20, serving as test devices, were subjected to a surge immunity test.

Specifically, the surge immunity test for each test device was conducted in the presence of a voltage (i.e., 600 Vac and 700 Vac) that is greater than the varistor voltage of the MOV(s) and an over-current of 0.5 A or an over-current for the PPTC chip (i.e., 10 A), by switching on for 60 seconds and then switching off. If all of the PPTC chip and the MOV(s) were not burned out and damaged, the test device was determined to pass the surge immunity test, and the time at which the PPTC chip of the test device tripped (i.e., trip time), if any, was recorded. If one of the PPTC chip and the MOV(s) was burned out, the test device was determined to be burned out, and the time at which the PPTC chip or the MOV was burned out (i.e., burned-out time) was recorded. The results are shown in Table 5.

TABLE 5

| | 600 V/0.5 A | | 600 V/10 A | | 700 V/0.5 A | | 700 V/10 A | |
|---|---|---|---|---|---|---|---|---|
| | Time (s) | Result | Time (s) | Result | Time (s) | Result | Time (s) | Result |
| E1 | 2.890 | Pass | 0.250 | Pass | 1.825 | Pass | 0.195 | Pass |
| E2 | 2.880 | Pass | 2.500 | Pass | 1.820 | Pass | 0.190 | Pass |
| E3 | 2.820 | Pass | 0.230 | Pass | 1.710 | Pass | 0.165 | Pass |
| E4 | 2.815 | Pass | 2.225 | Pass | 1.700 | Pass | 0.160 | Pass |
| E5 | 2.840 | Pass | 0.235 | Pass | 1.795 | Pass | 0.175 | Pass |
| E6 | 2.835 | Pass | 0.230 | Pass | 1.790 | Pass | 0.170 | Pass |
| E7 | 2.530 | Pass | 0.200 | Pass | 1.420 | Pass | 0.130 | Pass |
| E8 | 2.525 | Pass | 0.195 | Pass | 1.410 | Pass | 0.125 | Pass |
| C1 | 6.225 | MOV-1 Burned | 1.110 | MOV-1 Burned | 5.500 | MOV-1 Burned | 0.995 | MOV-1 Burned |
| C2 | 6.200 | MOV-1 Burned | 1.080 | MOV-1 Burned | 5.465 | MOV-1 Burned | 0.990 | MOV-1 Burned |
| C3 | 5.185 | MOV-2 Burned | 0.965 | MOV-2 Burned | 4.990 | MOV-2 Burned | 0.870 | MOV-2 Burned |
| C4 | 5.125 | MOV-2 Burned | 0.95 | MOV-2 Burned | 4.765 | MOV-2 Burned | 0.855 | MOV-2 Burned |
| C5 | 3.300 | Pass | 0.475 | Pass | 2.235 | Pass | 0.420 | Pass |
| C6 | 3.290 | Pass | 0.470 | Pass | 2.230 | Pass | 0.415 | Pass |
| C7 | 3.280 | Pass | 0.455 | Pass | 2.220 | Pass | 0.410 | Pass |
| C8 | 3.275 | Pass | 0.450 | Pass | 2.210 | Pass | 0.410 | Pass |
| C9 | 3.090 | Pass | 0.450 | Pass | 2.025 | Pass | 0.395 | Pass |
| C10 | 3.080 | Pass | 0.445 | Pass | 2.020 | Pass | 0.390 | Pass |
| C11 | 3.070 | Pass | 0.430 | Pass | 2.010 | Pass | 0.385 | Pass |
| C12 | 3.065 | Pass | 0.425 | Pass | 2.000 | Pass | 0.385 | Pass |
| C13 | 3.290 | Pass | 0.470 | Pass | 2.225 | Pass | 0.415 | Pass |
| C14 | 3.280 | Pass | 0.465 | Pass | 2.220 | Pass | 0.410 | Pass |
| C15 | 3.270 | Pass | 0.450 | Pass | 2.210 | Pass | 0.405 | Pass |
| C16 | 3.265 | Pass | 0.445 | Pass | 2.200 | Pass | 0.405 | Pass |
| C17 | 3.280 | Pass | 0.420 | Pass | 2.215 | Pass | 0.365 | Pass |
| C18 | 3.270 | Pass | 0.415 | Pass | 2.210 | Pass | 0.360 | Pass |
| C19 | 3.260 | Pass | 0.400 | Pass | 2.200 | Pass | 0.355 | Pass |
| C20 | 3.255 | Pass | 0.395 | Pass | 2.190 | Pass | 0.355 | Pass |

Note:
For a test device with a result that is shown as passed, the time recorded refers to the time period before the PPTC chip was tripped.
For a test device with a result that is shown as MOV burned, the time recorded refers to the time period before the MOV was burned out.

As shown in Table 5, the test devices of CE1 to CE4 containing only one of the MOV-1 and MOV-2 were burned out within 7 seconds under the over-current of 0.5 A and the over-voltage, or burned out within 2 seconds under the over-current of 10 A and the over-voltage, and such damage cannot be repaired. In contrast, all of the test devices of E1 to E8 and CE5 to CE20 containing the combination of the PPTC chip and at least one of the MOV-1 and the MOV-2 passed the surge immunity test without being burned out. This is due to the PPTC chip having a short trip time and being able to withstand high voltage. Moreover, as compared to E1, formation of the hole in the PPTC chip and/or the MOV(s) in E2 to E8 improves the heat transfer, which may further shorten the time period for the PPTC chip to be tripped, and thus prevents the over-current from flowing through the MOV-1 and the MOV-2, thereby protecting the MOV-1 and the MOV-2 of the test device from being burned out. In other words, in the test devices of E1 to E8, the PPTC chip trips before the MOV-1 or MOV-2 burns out in the presence of an over-current and a voltage that is greater than the varistor voltage of the MOVs.

In conclusion, by including the first and second voltage-dependent resistors 2, 3, by controlling the varistor voltage of the MOV-1 to be greater than that of MOV-2, and by making the PTC component, MOV-1, and MOV-2 be electrically connected in the way described above, the first voltage-dependent resistor 2 and the second voltage-dependent resistor 3 are cooperatively capable of protecting each other from being burned out under an over-current, an over-voltage, or a power surge condition in a short period of time, and thus the composite circuit protection device of this disclosure may be repeatedly used without being damaged, which demonstrates its excellent endurability and reliability.

In the description above, for the purposes of explanation, numerous specific details have been set forth in order to provide a thorough understanding of the embodiments. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what are considered the exemplary embodiments, it is understood that this disclosure is not limited to the disclosed embodiments but is intended to cover various arrangements included within the spirit and scope of the broadest interpretation so as to encompass all such modifications and equivalent arrangements.

What is claimed is:

1. A composite circuit protection device, comprising:
   a first positive temperature coefficient (PTC) component;
   a first voltage-dependent resistor;
   a second voltage-dependent resistor;
   a plurality of conductive leads that correspondingly connect to said first PTC component, said first voltage-dependent resistor and said second voltage-dependent resistor; and
   a second PTC component,
   wherein
   said second voltage-dependent resistor and said first PTC component are electrically connected in series,
   said first voltage-dependent resistor is electrically connected to the series connection of said first PTC component and said second voltage-dependent resistor are electrically connected in parallel,
   said first voltage-dependent resistor has a varistor voltage greater than that of said second voltage-dependent resistor as determined at 1 mA;

wherein each of said first voltage-dependent resistor and said second voltage-dependent resistor includes metal oxide; and wherein said first voltage-dependent resistor, the series connection of said first PTC component and said second voltage-dependent resistor, and said second PTC component are connected to an identical node.

2. The composite circuit protection device as claimed in claim 1, wherein said first PTC component includes
 a PTC layer that has two opposite surfaces, and
 first and second electrode layers that are respectively disposed on said two opposite surfaces of said PTC layer, each of said first and second electrode layers having a peripheral edge;

said first voltage-dependent resistor includes
 a first voltage-dependent resistor layer that has two opposite surfaces, and
 third and fourth electrode layers that are respectively disposed on said two opposite surfaces of said first voltage-dependent resistor layer, each of said third and fourth electrode layers having a peripheral edge;

said second voltage-dependent resistor includes
 a second voltage-dependent resistor layer that has two opposite surfaces,
 a fifth electrode layer that is disposed on one of said two opposite surfaces of said second voltage-dependent resistor layer and is connected to said second electrode layer of said first PTC component, and
 a sixth electrode layer that is disposed on the other one of said two opposite surfaces of said second voltage-dependent resistor layer and is adjacent to said third electrode layer of said first voltage-dependent resistor, each of said fifth and sixth electrode layers having a peripheral edge; and said conductive leads include a first conductive lead that is connected to said fourth electrode layer of said first voltage-dependent resistor, a second conductive lead that connects and is disposed between said third electrode layer of said first voltage-dependent resistor and said sixth electrode layer of said second voltage-dependent resistor, and a third conductive lead that is connected to said first electrode layer of said first PTC component.

3. The composite circuit protection device as claimed in claim 2, wherein each of said first and second electrode layers of said first PTC component has a surface having a surface area not greater than 90% of a surface area of a corresponding one of said two opposite surfaces of said PTC layer on which said each of said first and second electrode layers is disposed.

4. The composite over-current protection device as claimed in claim 2, wherein each of said third, fourth, fifth, and sixth electrode layers of said first voltage-dependent resistor and said second voltage-dependent resistor has a surface having a surface area not greater than 90% of a surface area of a corresponding one of said two opposite surfaces of each of said first and second voltage-dependent resistor layers on which each of said third, fourth, fifth, and sixth electrode layers is disposed.

5. The composite circuit protection device as claimed in claim 2, wherein said first PTC component is a polymer PTC (PPTC) component, said PTC layer is a PPTC layer.

6. The composite circuit protection device as claimed in claim 5, wherein said PTC layer has a composition including a non-grafted olefin-based polymer and a conductive filler.

7. The composite circuit protection device as claimed in claim 6, wherein said conductive filler is selected from the group consisting of carbon black, metal powders, and conductive ceramic powders.

8. The composite circuit protection device as claimed in claim 1, wherein said varistor voltage of said first voltage-dependent resistor is greater than 110% of said varistor voltage of said second voltage-dependent resistor as determined at 1 mA.

9. The composite circuit protection device as claimed in claim 1, wherein said varistor voltage of said first voltage-dependent resistor is greater than 120% of said varistor voltage of said second voltage-dependent resistor as determined at 1 mA.

10. The composite circuit protection device as claimed in claim 1, wherein said first PTC component trips before one of said first and second voltage-dependent resistors burns out in the presence of an over-current or an over-voltage.

11. The composite circuit protection device as claimed in claim 10, wherein said first PTC component trips within 0.00001 seconds to 10 seconds in the presence of an over-current or an over-voltage.

12. The composite circuit protection device as claimed in claim 10, wherein said first PTC component trips within 0.001 seconds to 10 seconds in the presence of an over-current that is not less than 0.5 A or an over-voltage that is greater than a varistor voltage of each of said first and second voltage-dependent resistors.

13. The composite circuit protection device as claimed in claim 10, wherein said first PTC component trips within 0.001 seconds to 1 second in the presence of an over-current that is not less than 10 A or an over-voltage that is greater than a varistor voltage of each of said first and second voltage-dependent resistors.

14. The composite circuit protection device as claimed in claim 1, wherein at least one of said first voltage-dependent resistor and said second voltage-dependent resistor includes a hole formed therein.

15. The composite circuit protection device as claimed in claim 1, wherein said first PTC component includes a hole formed therein.

16. The composite over-current protection device as claimed in claim 1, further comprising an encapsulant enclosing said first PTC component, said first and second voltage-dependent resistors, and a portion of each of said conductive leads.

17. The composite over-current protection device as claimed in claim 16, wherein said encapsulant is made of epoxy resin.

18. The composite over-current protection device as claimed in claim 1, further comprising a third voltage-dependent resistor that is electrically connected to the series connection of said first PTC component and said second voltage-dependent resistor in parallel.

* * * * *

UNITED STATES PATENT AND TRADEMARK OFFICE
CERTIFICATE OF CORRECTION

PATENT NO. : 11,682,892 B2
APPLICATION NO. : 17/396518
DATED : June 20, 2023
INVENTOR(S) : Chen et al.

It is certified that error appears in the above-identified patent and that said Letters Patent is hereby corrected as shown below:

In the Specification

Table 3, Column 11: Delete "C1" and insert --CE1--.
Table 3, Column 11: Delete "C2" and insert --CE2--.
Table 3, Column 11: Delete "C3" and insert --CE3--.
Table 3, Column 11: Delete "C4" and insert --CE4--.
Table 3, Column 11: Delete "C5" and insert --CE5--.
Table 3, Column 11: Delete "C6" and insert --CE6--.
Table 3, Column 11: Delete "C7" and insert --CE7--.
Table 3, Column 11: Delete "C8" and insert --CE8--.
Table 3, Column 11: Delete "C9" and insert --CE9--.
Table 3, Column 11: Delete "C10" and insert --CE10--.
Table 3, Column 11: Delete "C11" and insert --CE11--.
Table 3, Column 11: Delete "C12" and insert --CE12--.
Table 3, Column 11: Delete "C13" and insert --CE13--.
Table 3, Column 11: Delete "C14" and insert --CE14--.
Table 3, Column 11: Delete "C15" and insert --CE15--.
Table 3, Column 11: Delete "C16" and insert --CE16--.
Table 3, Column 11: Delete "C17" and insert --CE17--.
Table 3, Column 11: Delete "C18" and insert --CE18--.
Table 3, Column 11: Delete "C19" and insert --CE19--.
Table 3, Column 11: Delete "C20" and insert --CE20--.
Table 4, Column 11: Delete "C1" and insert --CE1--.
Table 4, Column 11: Delete "C2" and insert --CE2--.
Table 4, Column 11: Delete "C3" and insert --CE3--.
Table 4, Column 12: Delete "C4" and insert --CE4--.
Table 4, Column 12: Delete "C5" and insert --CE5--.
Table 4, Column 12: Delete "C6" and insert --CE6--.
Table 4, Column 12: Delete "C7" and insert --CE7--.
Table 4, Column 12: Delete "C8" and insert --CE8--.

Signed and Sealed this
Twenty-eighth Day of November, 2023

*Katherine Kelly Vidal*

Katherine Kelly Vidal
*Director of the United States Patent and Trademark Office*

Table 4, Column 12: Delete "C9" and insert --CE9--.
Table 4, Column 12: Delete "C10" and insert --CE10--.
Table 4, Column 12: Delete "C11" and insert --CE11--.
Table 4, Column 12: Delete "C12" and insert --CE12--.
Table 4, Column 12: Delete "C13" and insert --CE13--.
Table 4, Column 12: Delete "C14" and insert --CE14--.
Table 4, Column 12: Delete "C15" and insert --CE15--.
Table 4, Column 12: Delete "C16" and insert --CE16--.
Table 4, Column 12: Delete "C17" and insert --CE17--.
Table 4, Column 12: Delete "C18" and insert --CE18--.
Table 4, Column 12: Delete "C19" and insert --CE19--.
Table 4, Column 12: Delete "C20" and insert --CE20--.
Table 5, Column 13: Delete "C1" and insert --CE1--.
Table 5, Column 13: Delete "C2" and insert --CE2--.
Table 5, Column 13: Delete "C3" and insert --CE3--.
Table 5, Column 13: Delete "C4" and insert --CE4--.
Table 5, Column 13: Delete "C5" and insert --CE5--.
Table 5, Column 13: Delete "C6" and insert --CE6--.
Table 5, Column 13: Delete "C7" and insert --CE7--.
Table 5, Column 13: Delete "C8" and insert --CE8--.
Table 5, Column 13: Delete "C9" and insert --CE9--.
Table 5, Column 13: Delete "C10" and insert --CE10--.
Table 5, Column 13: Delete "C11" and insert --CE11--.
Table 5, Column 13: Delete "C12" and insert --CE12--.
Table 5, Column 13: Delete "C13" and insert --CE13--.
Table 5, Column 13: Delete "C14" and insert --CE14--.
Table 5, Column 13: Delete "C15" and insert --CE15--.
Table 5, Column 13: Delete "C16" and insert --CE16--.
Table 5, Column 13: Delete "C17" and insert --CE17--.
Table 5, Column 13: Delete "C18" and insert --CE18--.
Table 5, Column 13: Delete "C19" and insert --CE19--.
Table 5, Column 13: Delete "C20" and insert --CE20--.

In the Claims

Column 14, Lines 63-64: Delete "are electrically connected".